United States Patent [19]

Oppenlaender et al.

[11] 4,271,031

[45] Jun. 2, 1981

[54] COLOR STABILIZED NONIONIC SURFACTANTS AND ALKALINE CLEANSER FORMULATIONS CONTAINING THESE SURFACTANTS

[76] Inventors: Knut Oppenlaender, 23 Otto-Dill-Strasse, 6700 Ludwigshafen; Rainer Strickler, 14 Schroederstrasse, 6900 Heidelberg; Johannes Perner, 19 B Kiesstrasse, 6730 Neustadt 1; Wolfgang Trieselt, 1 Alwin-Mittasch-Platz, 6700 Ludwigshafen, all of Fed. Rep. of Germany

[21] Appl. No.: 127,469

[22] Filed: Mar. 5, 1980

[30] Foreign Application Priority Data

Mar. 16, 1979 [DE] Fed. Rep. of Germany ....... 2910402

[51] Int. Cl.[3] ........................ C09K 15/22; C11D 1/72; C11D 3/28; C11D 3/395

[52] U.S. Cl. ..................................... 252/156; 252/95; 252/99; 252/135; 252/174.21; 252/407; 252/524; 252/542; 252/DIG. 1; 568/580; 568/582

[58] Field of Search .................. 568/582, 580; 252/99, 252/135, 156, 174.21, 174.22, 407, 524, 542, DIG. 1, 95

[56] References Cited

U.S. PATENT DOCUMENTS

| | | | |
|---|---|---|---|
| 2,476,554 | 7/1949 | Lincoln | 568/582 |
| 3,061,552 | 10/1962 | Schenck | 252/135 |
| 3,382,178 | 5/1968 | Lissant | 252/135 |
| 4,088,594 | 5/1978 | Fernley | 252/174.21 |
| 4,126,586 | 11/1978 | Curtis | 252/524 |
| 4,132,703 | 1/1979 | Crochemore | 252/407 |
| 4,155,882 | 5/1979 | Davies | 252/548 |

FOREIGN PATENT DOCUMENTS

| | | | |
|---|---|---|---|
| 48-21082 | 6/1973 | Japan | 568/582 |

*Primary Examiner*—Dennis L. Albrecht

*Attorney, Agent, or Firm*—Oblon, Fisher, Spivak, McClelland & Maier

[57] ABSTRACT

Color-stabilized nonionic surfactants which contain chemically bonded poly(alkylene oxide) groups with terminal hydroxyl groups, wherein the color stabilizer is from 0.1 to 5% by weight, based on surfactant, of one or more compounds of the formula

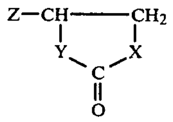

where X is O, $CH_2$, $C_2H_4$ or $C_3H_6$, Y is O or NH and Z is H, $CH_3$ or $CH_2OH$.

2 Claims, No Drawings

COLOR STABILIZED NONIONIC SURFACTANTS AND ALKALINE CLEANSER FORMULATIONS CONTAINING THESE SURFACTANTS

The present invention relates to nonionic surfactants based on poly(alkylene oxides) or on oxyalkylation products or hydrophobic compounds containing —OH or —NH— groups which are stabilized against discoloration, resulting from decomposition, not by blockage of the terminal hydroxyl groups but by containing a small amount of heterocyclic compounds which contain a —CO—O or —CO—NH— group as their common structural characteristic, and to alkaline cleanser formulations containing such color-stabilized nonionic surfactants.

Cleanser formulations for cleaning processes involving intense mechanical action, for example for bottlewashing or for domestic dishwashers, contain, as the main constituents, alkaline builders, such as phosphates, silicates, carbonates and even caustic alkalis. In addition to other additives, especially oxidizing agents and disinfectants, which may or may not be present, such cleanser formulations contain, as major and essential constituents, nonionic surfactants of the conventional categories, amongst which the most important are alkylene oxide copolymers and block polymers, and oxyalkylated ethylenepolyamines, propylenepolyamines or fatty alcohols, in which the alkylene oxide component consists either only of ethylene oxide or only of propylene oxide or of both; in the last-mentioned case, the polyaddition can be carried out with a gaseous mixture of the alkylene oxides or with the individual alkylene oxides successively, in which case a block structure results.

The surfactants employed are frequently those which in spite of having a good cleansing action generate little foam or even have an anti-foaming action, but specific problems may demand the use of copiously foaming surfactants.

At times, depending on the composition of the cleanser or depending on the temperature to which the cleanser is exposed, discolorations may be encountered. These, which are generally brown, are attributable to a chemical reaction between the nonionic surfactant, the alkali and an oxidizing substance, such as atmospheric oxygen or a chlorine donor present in the cleanser formulation. The color changes may, it is true, only be of a visual nature, without changing the performance characteristics of the product. However, in the case of commercial products which are principally sold for domestic use an unattractive appearance is an impediment to sales. Furthermore, the interaction between the surfactant, alkali and oxidizing agent may be so extensive as to produce detectable changes in the performance characteristics. It has been found that the free hydroxyl groups of the nonionic surfactants are the point of attack of the alkali and oxidizing agent. For this reason, there have been many attempts to convert the hydroxyl group into alkali-stable derivatives by chemical reaction. Important examples are etherification, for example with benzyl chloride, or acetalization. It is true that these procedures do give nonionic surfactants which have blocked end groups and which are sufficiently stable. However, the blockage of the end groups also produces a change in the physico-chemical properties. For example, the cloud point and the solubility in water are reduced. As regards the economics, the chemical reactions mentioned, which lead to nonionic surfactants having blocked end groups, are not simple to carry out and therefore add substantially to the costs of the product. A further aspect is that the blocking of the end groups reduces the biodegradability of such surfactants. This can even reach the point where legally prescribed minimum degradation rates are no longer met.

It is an object of the present invention to provide nonionic low-foam surfactants which are stable to the action of strong alkalis and oxidizing agents, whilst in other respects their performance characteristics are unchanged.

We have found that this object is achieved by adding, as the color stabilizer, from 0.1 to 5, preferably from 0.5 to 3, % by weight, based on the nonionic surfactant, of a compound of the formula I

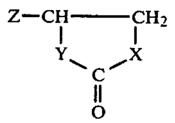

where X is O, $CH_2$, $C_2H_4$ or $C_3H_6$, Y is O or NH and Z is H, $CH_3$ or $CH_2OH$.

Examples of such compounds include cyclic esters and amides, eg. lactones, lactams and cyclic esters of carbonic acid with polyhydric alcohols, eg. glycol, 1,2-propylene glycol or glycerol. All these compounds conform to the formula defined above.

Specific examples of this group of compounds, which all possess, as a structural characteristic, a —CO—O—(ester) structure or —CO—NH—(amide) structure are ethylene carbonate, propylene carbonate, glycerol carbonate, ethylene carbamate, propylene carbamate, γ-butyrolactone, δ-valerolactone, ε-caprolactam and pyrrolidone. Mixtures of these compounds also have the effect to which the invention relates.

The color stabilizers are dissolved in the liquid, nonionic surfactant by stirring, advantageously at an elevated temperature.

According to the invention, from 0.1 to 5% by weight, based on surfactant, of stabilizer is added. Less than 0.1% by weight reduces the stability, and more than 5% by weight does not produce any additional advantages. The addition of from 0.5 to 3% by weight is preferred.

If the nonionic surfactant is not liquid at room temperature, it is fused and thereafter the procedure described is followed. After the color stabilizer has dissolved in the surfactant, the latter is again allowed to solidify. The surfactants and cleansers which have been color-stabilized in accordance with the invention can accordingly be in the form of liquids or solids.

To prepare the cleanser formulations, the color-stabilized surfactants are mixed—in exactly the same way as, previously, the non-color-stabilized surfactants—with the other constituents of the formulation, especially the alkaline builders mentioned at the outset, with or without further additives such as oxidizing agents, scents, dyes and disinfectants. In contrast to the mixtures which have not been color-stabilized, these mixtures have virtually no tendency to undergo conspicuous discoloration on storage, even at a high temperature. We have found that the color stabilizers are effective in virtually all ethylene oxide and ethylene oxide/- propylene oxide surfactants, ie. time-consuming experiments aimed at selecting specific surfactants are not necessary.

Cleanser formulations which contain the color-stabilized surfactants according to the invention in general comprise from 70 to 99, preferably from 90 to 99, % by weight of inorganic alkaline builder and from 30 to 1, preferably from 10 to 1, % by weight of surfactant, the percentages in each case being based on the total formulation.

The Examples which follow illustrate the invention. Percentages are by weight.

EXAMPLES

The alkylene oxide adducts were tested by storing them for 24 days, with and without added stabilizer, at various temperatures.

The samples kept at room temperature (RT) were stored without added NaOH; the samples stored at 50°and 70° C. contained solid sodium hydroxide. After the stated time, the iodine color number and the color of the sodium hydroxide were determined.

In the Table which follows, the first 3 vertical columns give the iodine color numbers and the last two the rating based on a visual examination of the solid sodium hydroxide.

The ratings ranged from a (very good, no brown deposit) to e (very poor, thick brown deposit). The Table clearly shows the substantially improved color stability of the surfactants containing the additives according to the invention, when compared with the non-stabilized surfactants.

In the Table , EO stands for ethylene oxide and PO for propylene oxide.

| | Assessment after 24 days | | | | |
|---|---|---|---|---|---|
| | Liquid (iodine color number) | | | Rating | |
| Example | RT | 50° C. | 70° C. | 50° C. | 70° C. |
| $C_{13/15}$-oxo-alcohol$(EO)_6(PO)_4$ | none | with NaOH | | | |

-continued

| | Assessment after 24 days | | | | |
|---|---|---|---|---|---|
| | Liquid (iodine color number) | | | Rating | |
| Example | RT | 50° C. | 70° C. | 50° C. | 70° C. |
| without additive | 0-1 | 30 | 40 | e | e |
| with 0.25% of γ-butyrolactone | 0-1 | 1-2 | 1-2 | c | d |
| with 0.5% of γ-butyrolactone | 0-1 | 1-2 | 1-2 | b | c |
| with 1% of γ-butyrolactone | 0-1 | 1-2 | 1-2 | a | b |
| tallow alcohol$(EO)_5(PO)_7$ | | | | | |
| without additive | 0-1 | 4 | 7 | e | e |
| with 0.5% of γ-butyrolactone | 0-1 | 1-2 | 1-2 | b | c |
| with 1% of γ-butyrolactone | 0-1 | 1-2 | 1-2 | b | b |
| with 1% of ethylene carbonate | 0-1 | 1-2 | 0-1 | c | b |
| with 1% of glycerol carbonate | 0-1 | 0-1 | 2-3 | a | b |
| with 1% of ε-caprolactone | 0-1 | 0-1 | 0-1 | a | b |
| with 1% of propylene carbonate | 0-1 | 1 | 0-1 | b | b |
| with 1% of γ-valerolactone | 0-1 | 0-1 | 0-1 | b | b |
| with 1% of δ-valerolactone | 0-1 | 0-1 | 0-1 | a | b |
| with 1% of pyrrolidone | 0-1 | 0-1 | 0-1 | b | b |
| with 1% of γ-valerolactam | 0-1 | 0-1 | 0-1 | c | d |
| $C_{9/11}$-oxo-alcohol$(EO)_{10}$ | | | | | |
| without additive | 1 | 9 | 18 | e | e |
| with 1% of butyrolactone | 1 | 1-2 | 3-4 | b | c |
| $C_{9/11}$-oxo-alcohol$(EO)_7$ | | | | | |
| without additive | 0-1 | 90 | 20 | e | e |
| with 1% of butyrolactone | 0-1 | 30 | 10 | c | c |
| with 1% of δ-valerolactone | 0-1 | 0-1 | 9 | c | c |
| with 1% of pyrrolidone | 0-1 | 7 | 9 | c | d |
| with 1% of ε-caprolactam | 0-1 | 9 | 5 | c | d |
| with 1% of γ-valerolactam | 0-1 | 3 | 3 | c | d |

We claim:

1. A color-stabilized nonionic surfactant which contains chemically bonded poly(alkylene oxide) groups with terminal hydroxyl groups, wherein the color stabilizer is from 0.1 to 5% by weight, based on surfactant, of one or more compounds of the formula

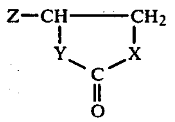

where X is O, $CH_2$, $C_2H_4$ or $C_3H_6$, Y is O or NH and Z is H, $CH_3$ or $CH_2OH$.

2. A strongly alkaline cleanser containing a color-stabilized surfactant as claimed in claim 1 as the active ingredient.

* * * * *